United States Patent [19]
Ackerman et al.

[11] Patent Number: 5,021,369
[45] Date of Patent: Jun. 4, 1991

[54] PROCESS FOR GELLING A SOL IN FIBERFORMED CERAMIC INSULATION

[75] Inventors: Patrice K. Ackerman, Kent; Anna L. Baker, Seattle, both of Wash.

[73] Assignee: The Boeing Company, Seattle, Wash.

[21] Appl. No.: 226,647

[22] Filed: Aug. 1, 1988

[51] Int. Cl.$^5$ ................................................ C04B 3/00
[52] U.S. Cl. ........................................ 501/95; 501/12; 501/127; 501/153
[58] Field of Search .................... 501/95, 12, 153, 127

[56] References Cited

U.S. PATENT DOCUMENTS

| | | | |
|---|---|---|---|
| 4,324,576 | 4/1982 | Matsuyama et al. | 501/12 |
| 4,828,774 | 5/1989 | Andersson et al. | 501/12 |

OTHER PUBLICATIONS

Clark et al., "Thermophoretic and Electrophoretic Deposition of Sol-Gel Composite Coatings", Ceramic Engineering Science Proceedings, 7(7-8), 1014-26, 1986

Ulrich, "Sol-Gel Processing", *Chemtech*, pp. 242-249, Apr. 1988.

*Primary Examiner*—William R. Dixon, Jr.
*Assistant Examiner*—Melissa Bonner
*Attorney, Agent, or Firm*—John C. Hammar

[57] ABSTRACT

A felted mat of ceramic fibers is impregnated with a sol-gel glass binder and is exposed to a low voltage direct current to catalytically gel the binder at ambient temperature and ambient pressure without pH conversion catalysts. The gelled binder can be easily converted to a ceramic thereafter and stabilized by firing above about 525° F.

24 Claims, No Drawings

PROCESS FOR GELLING A SOL IN FIBERFORMED CERAMIC INSULATION

TECHNICAL FIELD

The present invention relates to a process for gelling a sol-gel binder in a felted mat of ceramic fibers to form a rigid preform composite that can be handled.

BACKGROUND OF THE INVENTION

Felted ceramic fiber mats have poor strength and cannot be used as structural materials. Strength is achieved by binding the intersecting fibers with sol-gel binders, particularly those described by Yoldas in his article at 54 *Ceramic Bulletin* No. 3, 289-290 (1975), and curing the gelled sol to a glass. Firing the impregnated mats or catalyzing the gellation with inorganic acids or ammonia are the common methods used to gel the sol. Acid catalysts can introduce undesirable contaminants into the product. Ammonia requires that special equipment be used to isolate the processing environment.

We have discovered a simple way to gel the sol and, thereby, to form a preform composite from an impregnated felt mat. The method does not introduce impurities and does not require special equipment to protect the working environment from hazardous or toxic materials, like anhydrous ammonia.

SUMMARY OF THE INVENTION

Sols, particularly those of the Yoldas type, can be gelled at ambient temperature and pressure in air by exposing the sol for a sufficient period of time to a low voltage direct current. The process of the present invention allows the quick and simple preparation of fiberformed ceramic insulation without contaminating the material with acids or acid residues and without exposing the manufacturers to hazardous materials, such as ammonia.

BEST MODE CONTEMPLATED FOR THE PRESENT INVENTION

We have overcome the drawbacks of prior art gelling processes for sol-gel glass binders (sols) by discovering that low voltage direct currents applied across a saturated mat of felted ceramic fibers catalyzes gelling of the sol. The process of the present invention, accordingly, produces strengthened and rigid preform composites from the impregnated fiber mat without exposing the manufacturers to hazardous chemical catalysts, such as anhydrous ammonia; without requiring use of special (and oft-times expensive) equipment to establish a safe treatment environment; and without introducing undesirable contaminants to the product, as can be done if chemical acid catalysts are used.

Because the felted mats (usually made from one or more slurries by vacuum deposition) have poor strength, they must be treated to form ceramic composites that can be used as structural materials. Strength is usually achieved by gelling sol-gel glass binders in the mats to interconnect fibers with glass or ceramic bridges. Gelling can be achieved by heating the sol, but such heating can result in a weakened composite because evaporating water carries the sol to the surface of the mat leaving a low density (substantially unconsolidated) center. Accordingly, catalyzed gelling techniques have been developed to ensure an even density distribution. These techniques capitalize on the fact that the sols gel when the pH changes markedly higher or lower from the pH of the stable sol. The chemical catalysis, therefore, uses inorganic acids or bases, particularly ammonia, to convert the sol to a gel.

We have found these chemical techniques to be inadequate, particularly for large mats fabricated in complex curvature. In this circumstance, it becomes difficult to design a suitable housing in which to inject the acid or ammonia, and penetration of the catalyst to all portions of the mat can be difficult to achieve.

In the process of the present invention, we have overcome the problems of the prior art techniques by using a low voltage direct current to catalyze the gellation. A saturated mat of fibers can be wrapped with aluminum foil to define a circuit path from one foil electrode through the mat to the other foil electrode. By applying a low voltage direct current (usually at low power) across the electrodes, the sol-gel binder can be quickly converted to a gel at ambient temperature and ambient pressure. The resulting preform composite can be cured by drying to transform the gelled sol to a ceramic or glass.

To avoid rehydrating of the sol, we have found that a post-gelling firing of the preform composite at a temperature above about 525° F. should occur. The duration of this post-gelling firing will depend upon the size, shape, and composition of the composite.

A preferred alumina sol is prepared from aluminum alkoxides ($Al(OR)_3$) according to the method of Yoldas, *Ceramic Bulletin*, vol. 54, No. 3, p. 289-290 (1975), so that the sol and the resulting coating are clear. Aluminum isopropoxide or aluminum secondary-butoxide may be used. The alkoxides are added under vigorous stirring to hot water (usually doubly-distilled, deionized water at about 75° C. (160° F.)) at a molar ratio of water/alkoxide of about 100. A monohydroxide forms, due to hydrolysis of the alkoxide, and this monohydroxide can be peptized upon addition of acid. The slurry of alkoxide and water is stirred for about 15-20 min prior to adding the acid.

At least about 0.03 moles of acid/mole of aluminum alkoxide (hydroxide) must be added for peptization to occur at a temperature of between about 75°-90° C. and for a clear sol to form. The amount of acid added to the slurry should be limited, however, so that the ratio does not exceed about 0.10 for inorganic acids or about 0.25 for organic acids. Suitable acids are nitric, hydrochloric, perchloric, acetic, and trichloroacetic acids. Cloudy sols may be formed with chloroacetic or formic acids. During peptization the slurry should be kept at a temperature of at least about 80° C. (170° F.).

A preferred silica sol is prepared from hydrolyzed or unhydrolyzed tetraethylorthosilicate (TEOS), and is commercially available under the trademark SILBOND from the Stauffer Chemical Co. Other sols may also be used with alkoxide or acetate precursors.

We prefer alumina sols of the Yoldas type in this application.

As described in Baker's copending U.S. Pat. application Ser. No. 698,496, the best results may be achieved by incremental impregnation and gellation of the sol in the mat. We generally use an initially saturated mat and can add more sol as the gelling process continues.

The felted mat can be made from any of the common ceramic fibers or mixtures thereof, and generally comprises silicate, alumina, or zirconia fibers in chopped or whisker form. Silicon carbide or silicon nitride fibers may also be used. We prefer to use aluminosilicate or mullite fibers.

An advantage of the process of the present invention is that it also allows the preparation of preform composites having layers of differing density. In felted mats, the gellation appears to occur most rapidly adjacent the cathode (- electrode). The thickness of this dense layer can be readily controlled by the duration of the gelling cycle (i.e., the time power is supplied). Dense layers adjacent each electrode can be prepared by reversing the polarity after a predetermined time. The increased density is retained by resaturating the mat following the d.c. gelling step(s) and, then, curing the resaturated mat by additional gelling, drying, and firing steps. Dense surfaces provide greater strengths in the area for bonding the ceramic to other materials without requiring as dense an overall material. That is, a material of lesser overall average density can be used because its surfaces have sufficient density (i.e. strength) for adhesive bonding while its center or core has a lower density.

Post-gelling curing follows conventional steps with the caveat that rehydration of the sol can occur unless the composite is heat treated at a temperature of at least about 525° F. Generally the gelled mat preform composite will be dried in air at ambient temperature and pressure for an extended time, will be dried at about 70°–100° C., and will then be heat treated. Those skilled in the art will recognize these post-gelling curing steps.

We prefer that the direct current be applied for a given Polarity for about 1 to 180 minutes at a voltage in the range from about 10 to 100 volts at a current of about 0.1 amps. The time, voltage, and current are determined in relation to the volume of the sol-saturated mat with larger mats generally requiring longer times and/or higher power.

U.S Pat. No. 4,324,576 (Matsuyama) describes a method for producing optical glass by forming a high-silica-content gel hydrolysis (using an applied d.c. voltage). The method uses a silicon alkoxide (preferably $Si(OCH_3)_4$ or $Si(OC_2H_5)_4$). The gellation of this sol can be accelerated by the application of a d.c. voltage. We are uncertain that the Matsuyama sol, however, has promise in the preparation of ceramic composites, and prefer to use alumina sols.

We have discovered that the results differ if the mat is simply felted prior to d.c. current gelling or is rigid. That is, a dense region adjacent the cathode can be formed in a felted mat, but, if the mat is already rigid (has existing gelled bridges), upon resaturation with the sol and d.c. gelling, a uniform density gelled product will result. Although not fully understanding the mechanism, we believe that the gelled bridges apparently generate a uniform distribution of the sol and/or the field through the mat that does not occur with simply a felted mat. The method of the present invention, therefore, is particularly useful for increasing the density of a rigid mat through incremental gelling of additional sol, and provides a substantially uniform density increase for each increment.

The following examples illustrate features of the present invention:

EXAMPLE 1

A 1.5 in diameter disk of alumina-silica fiber mat (HSA Fiberfrax) 0.5 in thick was saturated with an alumina sol and was placed on aluminum foil in a pan reservoir. A second piece of aluminum foil was pressed down on the top of the mat in direct contact with the top surface. Leads from a direct current power source (a battery) were clipped to each piece of aluminum foil (negative to the top and positive to the bottom). Ten volts were applied for about 10 minutes at least 0.1 amp. A rigid layer (about 1/32 in) formed adjacent the top surface of the mat at the foil interface. The rest of the mat remained soft (i.e., substantially ungelled).

EXAMPLE 2

An alumina-silica fiber mat (15 lb/ft$^3$ density) disk (1" diameter×0.5" thick) was placed in 35 ml of alumina sol in a reservoir. Aluminum foil electrodes were used as in Example 1. Ten volts were applied for 3 hours. Gelled layers developed on the upper and lower surfaces of the mat. Sol in the reservoir also partially gelled (such gelling would not have occurred as rapidly without the catalytic effect of the current).

EXAMPLE 3

A 2"×2"×0.6" piece of fiber mat was saturated with 39 ml of alumina sol and the impregnated mat was arranged between electrodes as in Example 1. Twenty-eight volts were applied. After two hours, an additional 2.5 ml of sol were added and the polarity was reversed and current was applied for two more hours. Both outer surfaces developed rigid, high density layers caused by gelling of the sol. While the original density was 7.98 lb/ft$^3$, the final density was 15.57 lb/ft$^3$.

While preferred embodiments have been described, those skilled in the art will readily recognize alterations, variations, or modifications which might be made to the embodiments without departing from the inventive concept. Therefore, the claims should be interpreted liberally with the support of the full range of equivalents known to those of ordinary skill based upon this description. The claims should be limited only as is necessary in view of the pertinent prior art.

We claim:

1. A method for gelling a sol to strengthen a felted mat of ceramic fibers, comprising the steps of:
   (a) impregnating the mat with a sol-gel binder; and
   (b) exposing the impregnated mat at ambient temperature and ambient pressure to a low voltage, direct current for a sufficient time to gel the binder.

2. The method of claim 1 wherein the binder is an alumina sol.

3. The method of claim 1 further comprising heat treating the mat at a temperature of at least about 525° F.

4. The method of claim 1 wherein the voltage is in the range of about 10–100 V.

5. The product of the process of claim 1.

6. The method of claim 1 further comprising the step of converting the gelled binder to a ceramic.

7. The method of claim 6 wherein the converting step includes drying the gelled binder.

8. The method of claim 6 wherein impregnating saturates the mat with sol.

9. The method of claim 8 wherein the sol is an alumina sol made from alkoxides in a water/ethanol carrier.

10. The product of the process of claim 9.

11. The method of claim 9 wherein the exposing step includes positioning a first electrode along a first surface of the mat, positioning a second electrode along a second surface of the mat to define a circuit path comprising the two electrodes and the saturated mat, and connecting the electrodes to establish direct current of a first polarity across the electrodes.

12. The method of claim 11 further comprising the step of reversing the polarity of the direct current after a period of time so that the mat develops gelled layers of high strength and density adjacent the first and second surfaces.

13. The product of the process of claim 12.

14. The method of claim 1 further comprising the step of adding additional sol-gel binder to the mat after a predetermined time as the initial amount of sol-gel binder decreases.

15. The method of claim 9 further comprising heat treating the mat after gelling of the binder at a temperature of at least about 525° F.

16. The product of the process of claim 15.

17. The method of claim 1 comprising the step of repeating steps (a) and (b) to increase the density of the mat by gelling additional binder.

18. The method of claim 1 wherein the mat initially includes gelled sol bridges between the felted ceramic fibers.

19. A method for forming a rigid fiberform ceramic comprising the steps of:
    (a) preparing at least one slurry of ceramic fibers;
    (b) felting the fibers from the slurry to form a mat;
    (c) impregnating the mat with a sol-gel binder;
    (d) gelling the sol-gel binder by exposing the impregnated mat to a low voltage direct current for a 1-180 minutes;
    (e) repeating steps (c) and (d) to produce a preform composite of a predetermined density;
    (f) drying the preform composite to form the fiberform ceramic body; and
    (g) heat treating the dried ceramic body at a temperature above at least about 525° F. for preventing rehydration of the sol.

20. The product of the process of claim 19.

21. The method of claim 1 wherein the binder is an alumina sol and the voltage is in the range of about 10-100 V and further comprising heat treating the mat, after exposing the mat to the voltage, at a temperature of a least about 525° F.

22. The method of claim 21 wherein the exposing step involves using about 0.1 amp for 1-180 minutes.

23. A method for forming fiberform composites having controlled areas of differing density comprising the steps of:
    (a) forming a preform ceramic fiber mat;
    (b) applying an anode and a cathode to the surfaces of the mat;
    (c) infiltrating a sol-gel binder into the mat;
    (d) defining areas of differing density in the mat by gelling the sol-gel binder by applying a low voltage, direct current to the anode and cathode at ambient temperature, to form a region of higher density adjacent the cathode; and
    (e) firing the mat after step (d) at a temperature of at least about 525° F. to prevent rehydration of the sol-gel binder.

24. A method for controlling the density of a fiberform ceramic composite having a felted mat of fibers bound with a sol-gel binder, comprising the step of controlling the duration of exposure of a saturated mat of the felted fibers and ungelled binder to a low voltage, direct current at ambient temperature to gel the binder to achieve a high density.

* * * * *